US012455549B2

(12) United States Patent
Peters

(10) Patent No.: US 12,455,549 B2
(45) Date of Patent: Oct. 28, 2025

(54) AUTOMATED TOOL PATH GENERATION FOR MACHINING WORKPIECES

(71) Applicant: THE BOEING COMPANY, Arlington, VA (US)

(72) Inventor: Justin L. Peters, Carrollton, IL (US)

(73) Assignee: The Boeing Company, Arlington, VA (US)

( * ) Notice: Subject to any disclaimer, the term of this patent is extended or adjusted under 35 U.S.C. 154(b) by 405 days.

(21) Appl. No.: 18/331,082

(22) Filed: Jun. 7, 2023

(65) Prior Publication Data

US 2024/0411285 A1 Dec. 12, 2024

(51) Int. Cl.
*G05B 19/4093* (2006.01)
(52) U.S. Cl.
CPC . *G05B 19/40935* (2013.01); *G05B 19/40938* (2013.01); *G05B 2219/33099* (2013.01)
(58) Field of Classification Search
None
See application file for complete search history.

(56) References Cited

U.S. PATENT DOCUMENTS

| 2003/0040834 A1* | 2/2003 | Coleman | G05B 19/4099 |
| | | | 700/182 |
| 2006/0106486 A1* | 5/2006 | Tanaka | G05B 19/40938 |
| | | | 700/186 |
| 2020/0094374 A1* | 3/2020 | Beaucamp | B24B 49/183 |

* cited by examiner

*Primary Examiner* — Ryan A Jarrett
(74) *Attorney, Agent, or Firm* — Walters & Wasylyna LLC

(57) ABSTRACT

The present disclosure provides techniques for automated tool path planning for machining complex workpieces. Other aspects including related systems are also provided. An example method includes obtaining an indication of one or more parameters associated with the workpiece. A down and out (DnO) tool path plan for machining the workpiece is determined. A material removal component is selected for machining the workpiece, based on the one or more parameters and the DnO tool path plan. Extraneous material is removed from the workpiece according to the DnO tool path plan with the selected material removal component.

20 Claims, 19 Drawing Sheets

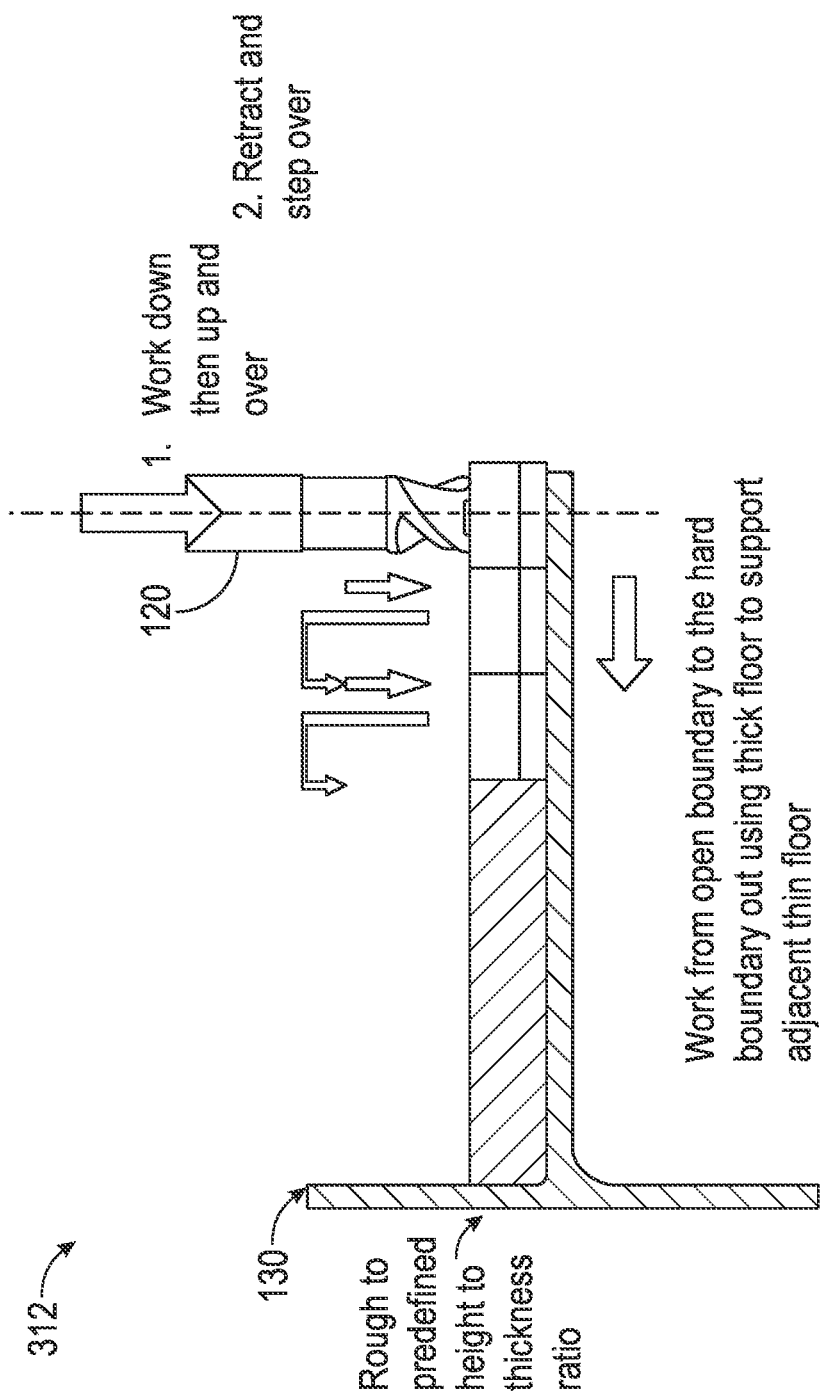

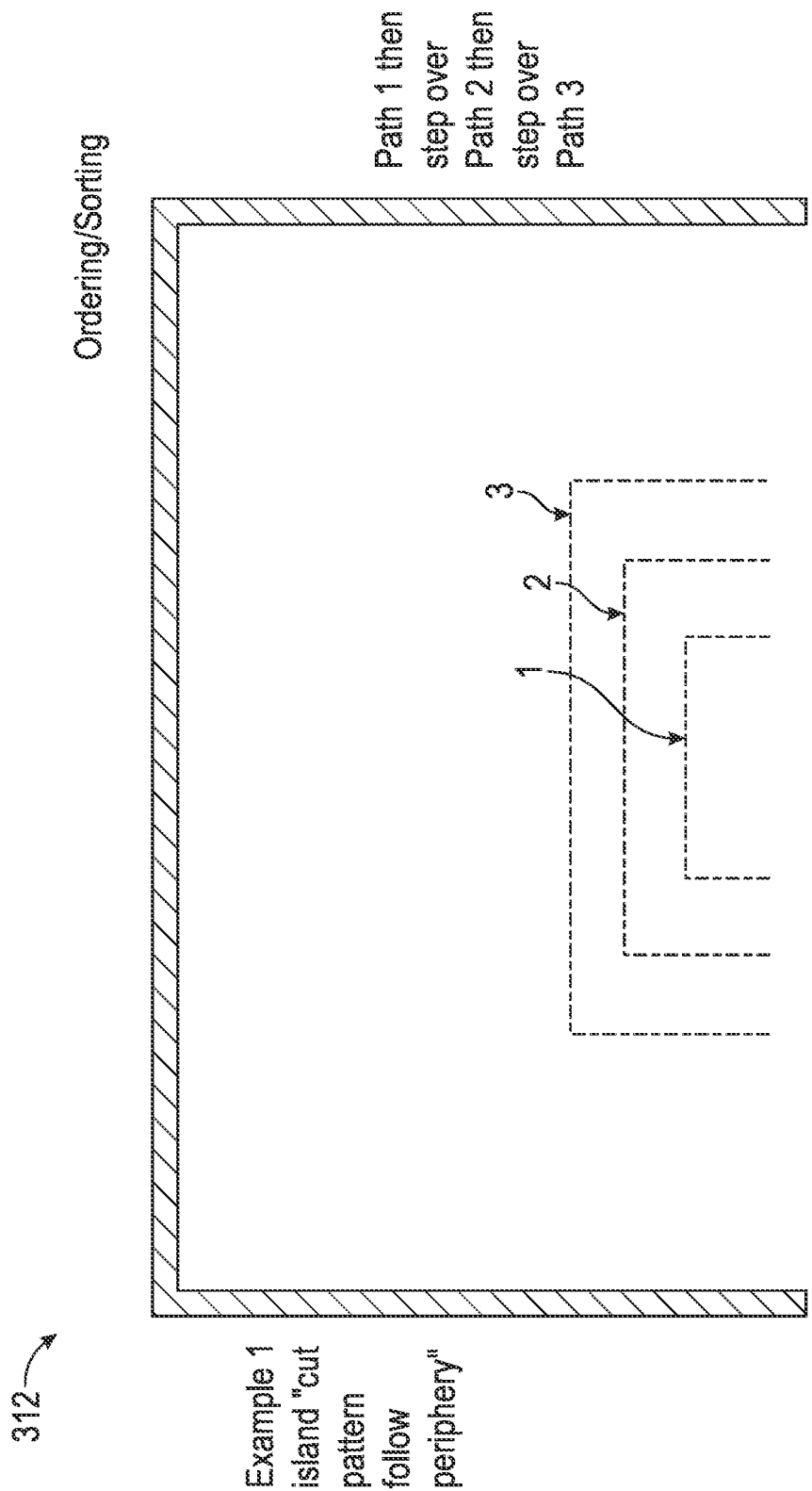

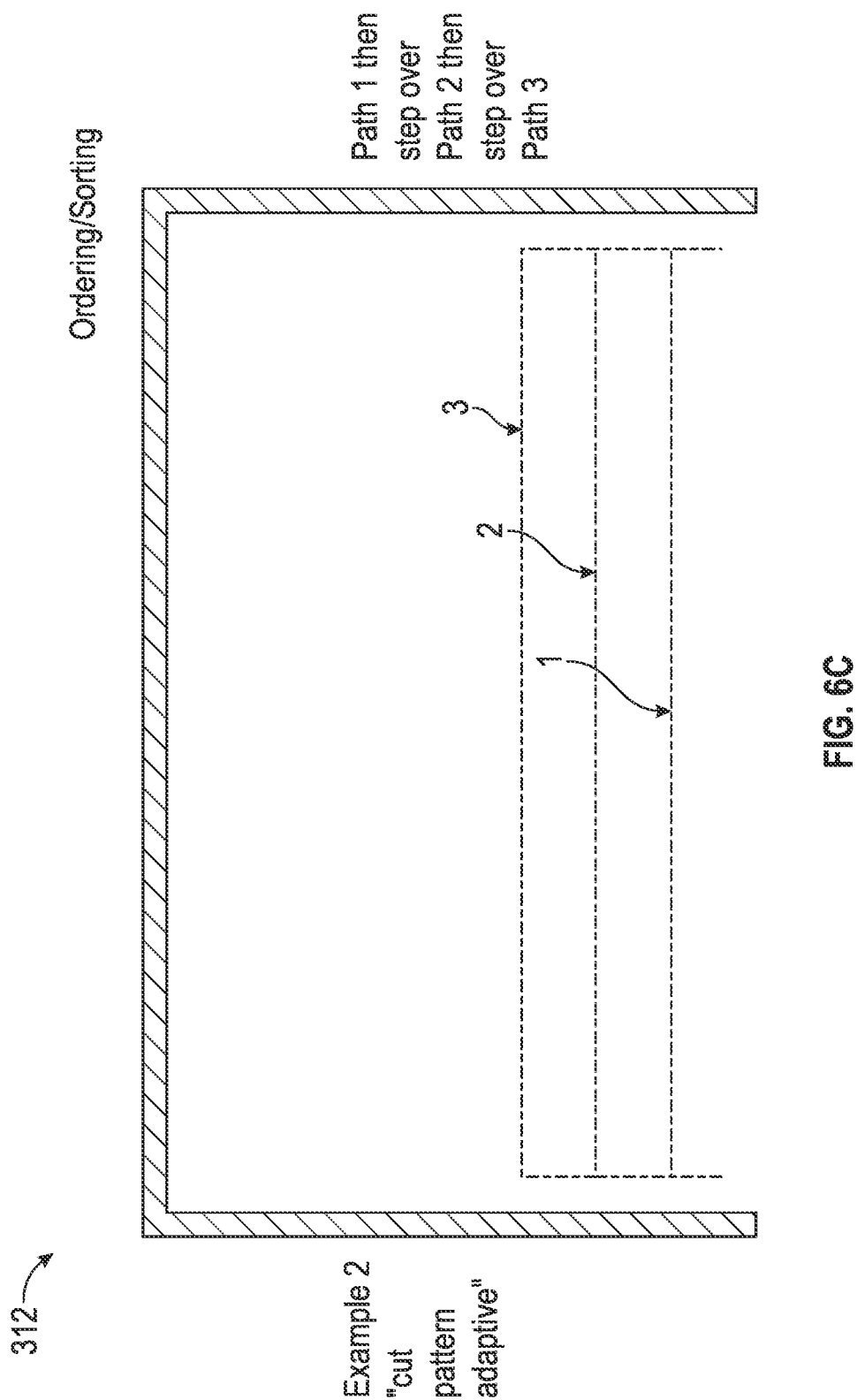

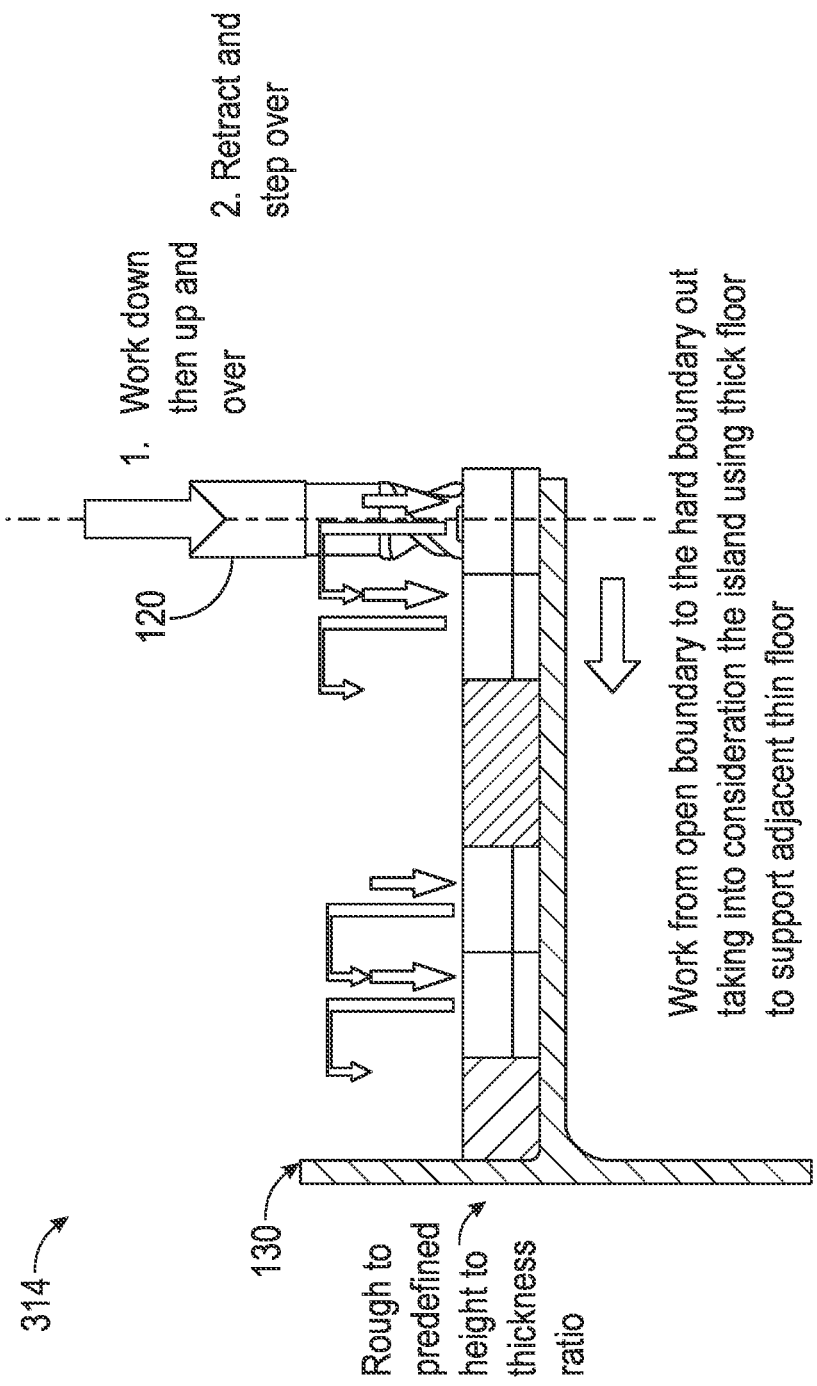

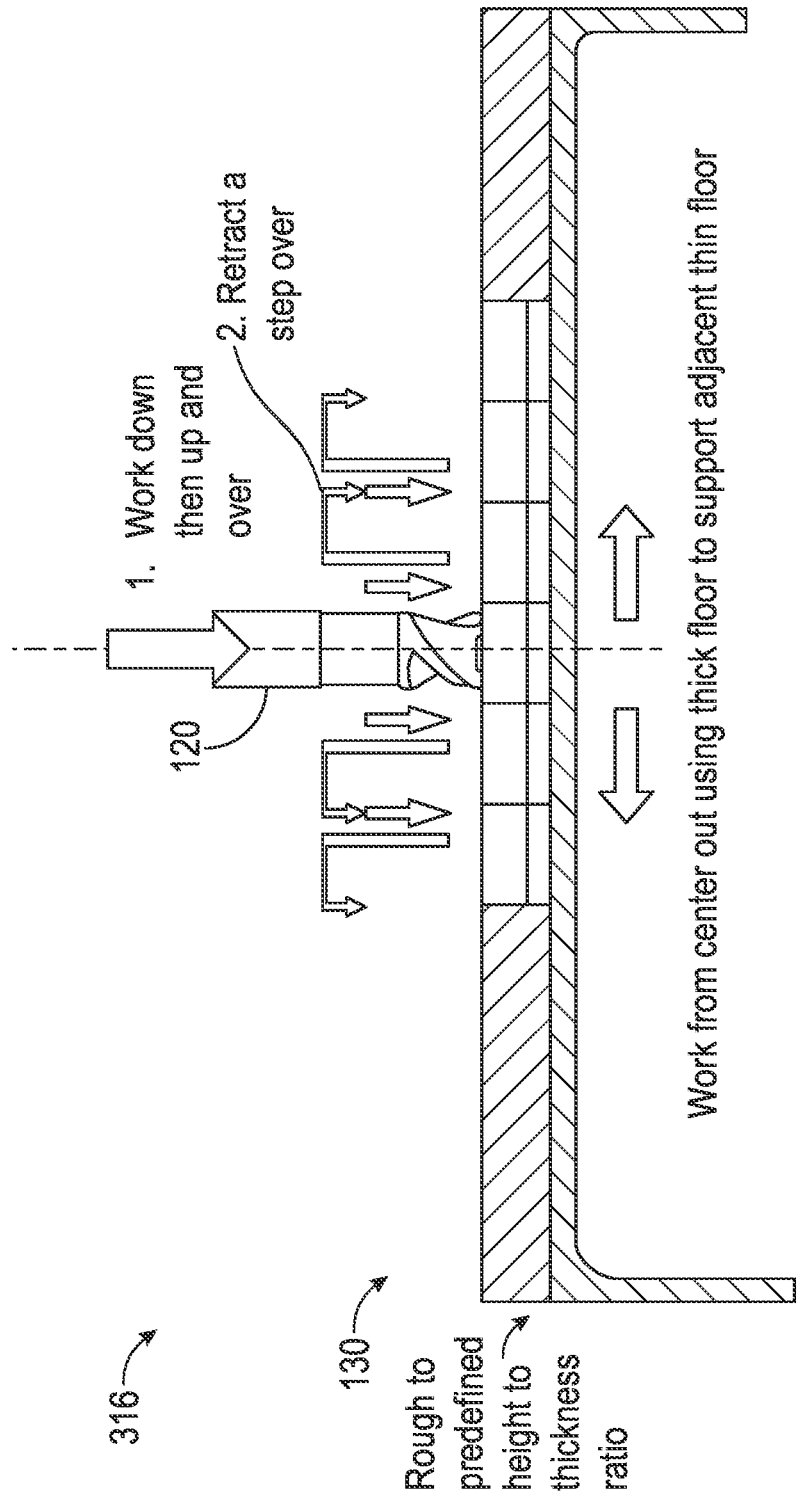

AUTOMATED TOOL PATH GENERATION FOR MACHINING WORKPIECES

FIELD

Aspects of the present disclosure generally relate to automated control of machining tools. More specifically, aspects of the present disclosure relate to automated tool path planning for machining complex parts or workpieces.

BACKGROUND

As demand increases for higher performance products at reasonable cost, products may have to be constructed from components that may have to be more precisely shaped while also being more economical to produce. In order to form components with particular specifications, an incomplete component, herein called a "workpiece," may undergo one or more manufacturing operations to remove extraneous material from the workpiece to form a finished component. One manufacturing operation may include removing extraneous material of the workpiece by moving at least one of a material removal component or the workpiece relative to each other upon a predetermined trajectory, herein called a "tool path," to remove the extraneous material. The predetermined trajectory may be accomplished, for example, by computer numerical control (CNC).

For certain workpieces, current manufacturing operations used to remove extraneous material from the workpiece can lead to the finished component having quality issues. For example, with basic machining dynamic systems, force vibrations can cause oscillations between the workpiece and material removal component (e.g., cutting tool) during machining processes. Such force vibrations can impact the quality of the finished component, leading to rework or destruction of the finished component.

SUMMARY

One embodiment of the present disclosure is a computer-implemented method for machining a workpiece. The computer-implemented method includes obtaining an indication of one or more parameters associated with the workpiece. The computer-implemented method also includes determining a down and out (DnO) tool path plan for machining the workpiece. The computer-implemented method also includes selecting a material removal component for machining the workpiece, based at least in part on the one or more parameters and the DnO tool path plan. The computer-implemented method further includes removing, with the selected material removal component, extraneous material from the workpiece according to the DnO tool path plan.

Another embodiment of the present disclosure is a material removal system. The material removal system includes a material removal component, a memory including executable instructions, and a processor in data communication with the memory and configured to execute the executable instructions to perform an operation. The operation includes obtaining an indication of one or more parameters associated with the workpiece. The operation also includes determining a down and out (DnO) tool path plan for machining the workpiece. The operation also includes selecting the material removal component for machining the workpiece, based at least in part on the one or more parameters and the DnO tool path plan. The operation further includes removing, with the selected material removal component, extraneous material from the workpiece according to the DnO tool path plan.

Another embodiment of the present disclosure is a computer-readable storage medium. The computer-readable storage medium includes computer-readable program code embodied therewith for performing an operation. The operation includes obtaining an indication of one or more parameters associated with the workpiece. The operation also includes determining a down and out (DnO) tool path plan for machining the workpiece. The operation also includes selecting the material removal component for machining the workpiece, based at least in part on the one or more parameters and the DnO tool path plan. The operation further includes removing, with the selected material removal component, extraneous material from the workpiece according to the DnO tool path plan.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIGS. 6A-6C depict different views of another example DnO tool path, according to certain aspects of the present disclosure.

FIGS. 7A-7C depict different views of another example DnO tool path, according to certain aspects of the present disclosure.

FIGS. 8A-8B depict different views of another example DnO tool path, according to certain aspects of the present disclosure.

DETAILED DESCRIPTION

Figure 1:
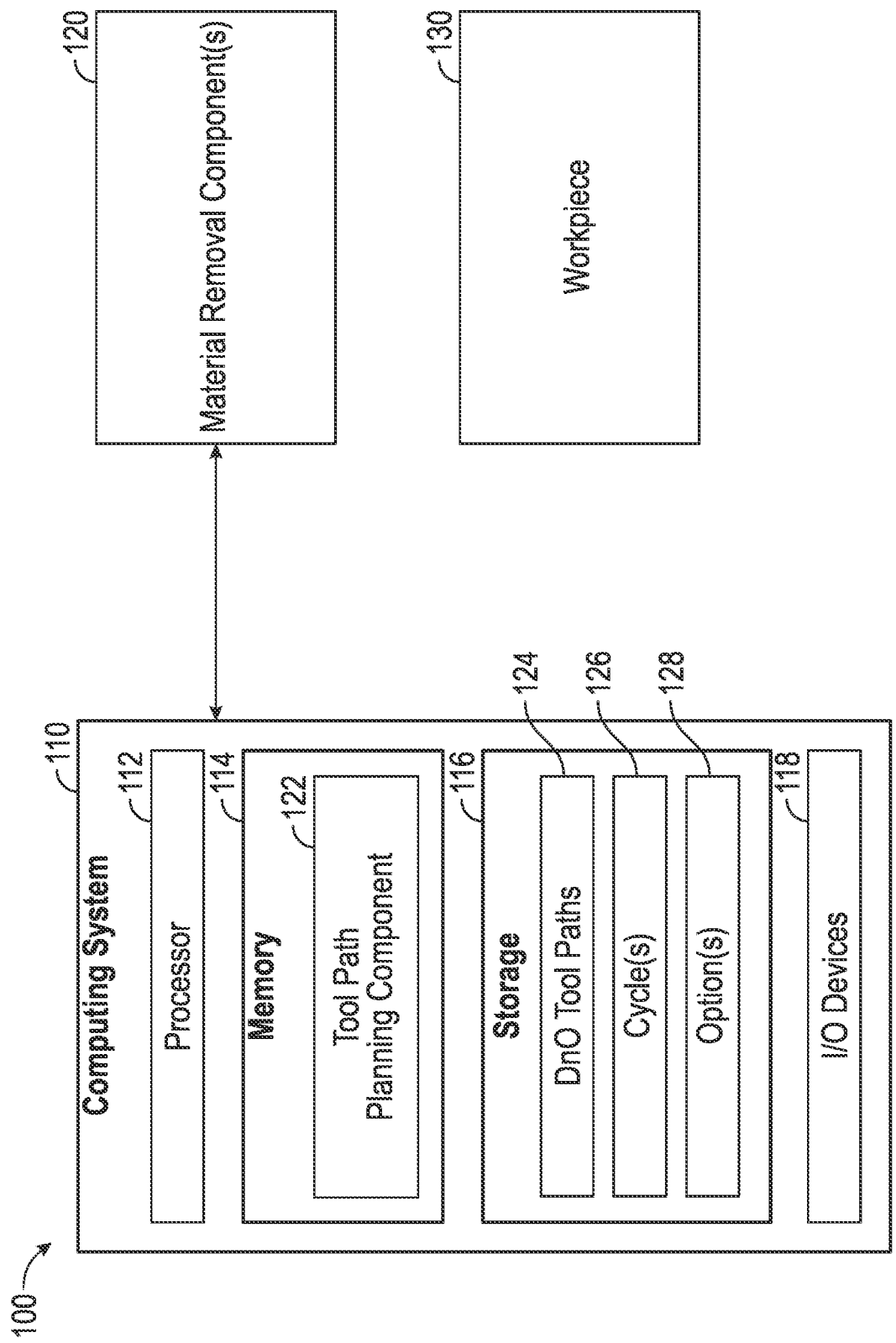
FIG. 1 is a block diagram illustrating an example system for automating tool path planning for machining workpieces, according to certain aspects of the present disclosure.

One issue with basic machining dynamic systems is that force vibrations may cause oscillations between the workpiece and material removal component (e.g., cutting tool) during machining processes. One reference example of such an event is when the workpiece has unsupported thin floor part features during the machining process. For such workpieces, the final thickness of the workpiece geometry may not be inheritably stiff enough and may be too thin to withstand the machining parameters. Additionally, the spring-mass-damper system may be overcome, causing chatter. Chatter during machining as well as material removal component vibrations can leave an imprint on the machined surface and cause poor quality.

Certain approaches for addressing material removal component vibrations and chatter during machining generally involve designing dedicated, custom fixtures to support the workpiece adequately during manufacturing processes of large quantities. However, the design of dedicated, custom fixtures is typically associated with significant costs and lead time. The impact of the cost and lead time can dramatically impact prototypes, low rate or spares part because the non-recurring cost may not be spread over large quantities of parts. Additionally, while reconfigurable workholding can be used to mitigate the cost and lead time of dedicated, custom fixtures, reconfigurable workholding approaches can still involve significant amounts of time and may not be suitable for workpieces that have complex geometries.

Accordingly, certain aspects of the present disclosure provide methods for automating tool path planning for machining of complex workpieces. Other aspects including related systems and computer readable mediums are also discussed. In certain aspects, a tool path for removing material from a workpiece with a material removal component is automatically generated based at least in part on the type of workpiece. The generated tool path may be used for a variety of complex workpieces, including, for example, workpieces having thin floor part features. Note, however, that the methods described herein can be used for the generation of a tool path for any workpiece output from a numerically controlled machine.

In certain aspects described below, a method of machining pockets on a thin workpiece with a material removal component includes a tool path plan for bottom milling thin floor parts with the material removal component. The tool path plan includes using, via the material removal component, a down and out (DnO) tool path that maintains a predefined height to thickness ratio and variable depth per strike. The DnO tool path can be applied for automated tool path trajectory planning and integrated as a universal solution to computer software utility programs that include a tool path manufacturing workbench, as well as to programs in the field of computer aided design (CAD), computer aided manufacturing (CAM), and computer aided engineering (CAE). The DnO tool path(s) described herein can significantly reduce (and, in some cases, eliminate) the cost and lead time associated with dedicated fixture and reconfigurable workholding approaches.

Additionally, in certain aspects described below, the DnO tool path encompasses a variety of discrete tool path planning "cycles" for automated planning of basic types of machine part geometries in industry. Examples of such "cycles" include, but are not limited to, "closed pocket," "closed pocket with island," "open pocket," "open pocket with island," "facing," and "facing with island." Each "cycle" provides explicit instructions for tool path trajectory to machine geometry while dynamically maintaining rigidity. Further, in certain aspects described below, each "cycle" includes one or more "options," which provide different ordering and sorting of the cutting patterns for the tool path trajectory. As a reference non-limiting example, one option of "closed pocket with island" is called "island first," which defines a cut pattern that follows the periphery of the island first and step the path over in sequence.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 is a block diagram illustrating an example system 100 for automating tool path planning for machining complex workpieces, according to certain aspects of the present disclosure. The system 100 includes a computing system 110, one or more material removal components 120, and a workpiece 130. The computing system 110 is generally configured to control the material removal component(s) 120 to machine the workpiece 130 as part of a machining process. The computing system 110 is representative of a variety of computing systems (or devices), including, for example, a laptop computer, a mobile computer (e.g., a tablet or a smartphone), a server computer, a desktop computer, etc.

The computing system 110 includes a processor 112, a memory 114, storage 116, and one or more input/output (I/O) devices 118. The processor 112 is any electronic circuitry, including, but not limited to one or a combination of microprocessors, microcontrollers, application specific integrated circuits (ASIC), application specific instruction set processor (ASIP), and/or state machines, that communicatively couples to memory 114 and controls the operation of the computing system 110, the material removal component(s) 120, or a combination thereof. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The processor 112 may include other hardware that operates software to control and process information. The processor 112 executes software stored on the memory 114 to perform any of the functions described herein. The processor 112 controls the operation and administration of the computing system 110 by processing information (e.g., information received from the processor 112, memory 114, storage 116, I/O devices 118, or a combination thereof). The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, storage 116, a disk, a CD, or a flash drive. In particular embodiments, the software may include an application executable by the processor 112 to perform one or more of the functions described herein. Here, the memory 114 includes a tool path planning component 122, which is described in greater detail herein.

The storage 116 may be a disk drive or flash storage device. Although shown as a single unit, the storage 116 may be a combination of fixed and/or removable storage devices, such as fixed disc drives, removable memory cards, optical storage, network attached storage (NAS), or a storage area-network (SAN). Storage 116 includes one or more DnO tool paths 124, one or more cycles 126, and one or more options 128, which are described in greater detail herein. The I/O devices 118 may include, but are not limited to, one or more of a keypad, a keyboard, a touch-sensitive display screen, a liquid crystal display (LCD) screen, a microphone, a speaker, a communication port, or any combination thereof.

The material removal components 120 are generally representative of various tools used to remove extraneous material from a workpiece 130. Examples of material removal components 120 may include different types of CNC cutting tools, such as drill bits, end mills, face mills, reamers, gear cutters, hollow mills, thread mills, slab mills, and fly cutters. Additionally, each material removal component 120 may have a different configuration or geometry compared to another material removal component 120.

Figure 2:
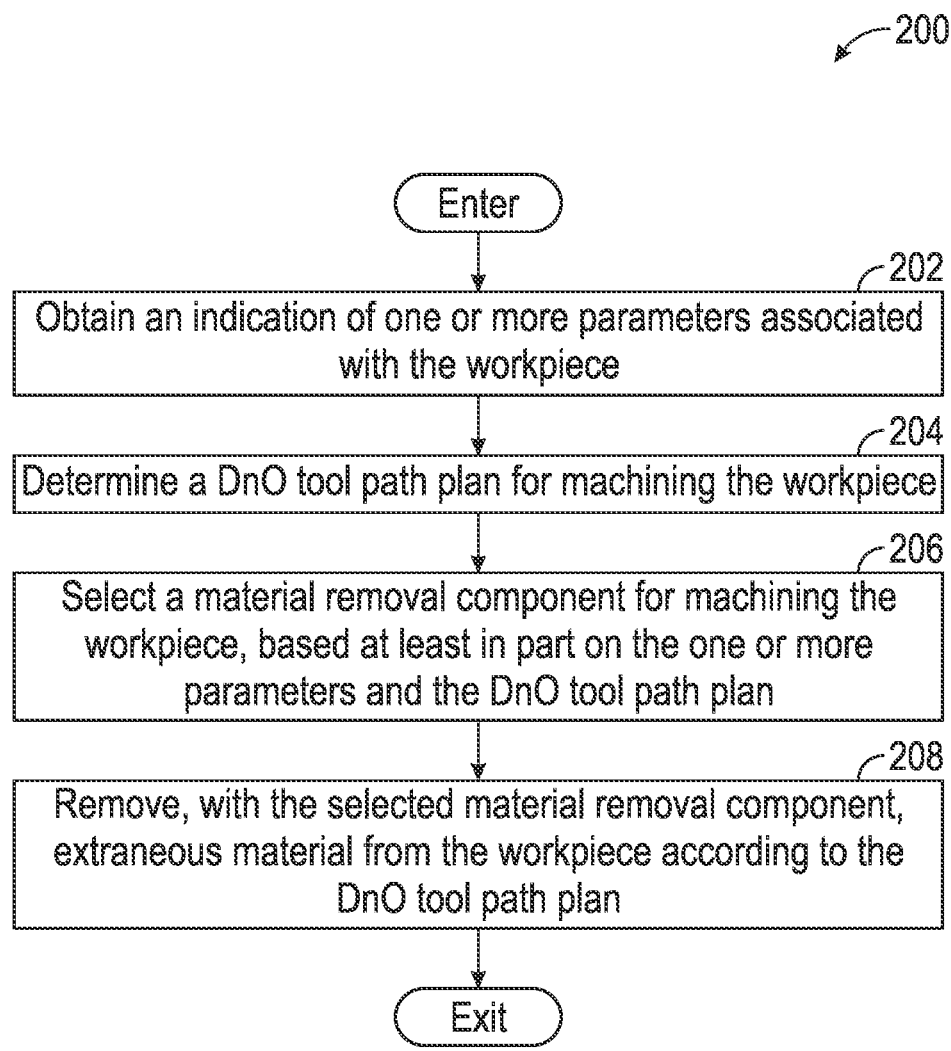
FIG. 2 is a flowchart of a method for generating a tool path plan for machining workpieces, according to certain aspects of the present disclosure.

FIG. 2 is a flowchart of a method 200 for generating a tool path for machining a workpiece (or part) 130 using a material removal component 120, according to certain aspects of the present disclosure. Method 200 may be performed by a tool path planning component (e.g., tool path planning component 122).

Method 200 enters with block 202, where the tool path planning component obtains an indication of one or more parameters associated with a workpiece 130. In certain aspects, an operator may use the computing system 110 to input the one or more parameters. In certain aspects, the tool path planning component may obtain the parameter(s) from a storage system (e.g., storage 116).

At block 204, the tool path planning component determines a DnO tool path plan for machining the workpiece. In certain aspects, the determination of the DnO tool path plan includes receiving an indication of the DnO tool path plan, out of multiple DnO tool path plans, from an operator (e.g., via computing system 110).

At block 206, the tool path planning component selects a material removal component for machining the workpiece, based at least in part on the one or more parameters and the DnO tool path plan. In certain aspects, the material removal component is selected from multiple material removal components available for machining the workpiece.

At block 208, the tool path planning component removes, with the selected material removal component, extraneous material from the workpiece according to the DnO tool path plan. In certain aspects, the DnO tool path plan includes a pattern along the workpiece for the material removal component to follow when removing the extraneous material from the workpiece. In certain aspects, the pattern may have different types of shapes, such as a rectangular shape, radial shape, spiral shape, or zig-zag shape, as illustrative, non-limiting examples. In aspects where the pattern has a rectangular shape, the pattern may extend laterally and outwardly each direction along the workpiece. In certain aspects, the DnO tool path may further maintain a predefined height to thickness ratio for the workpiece and specify a variable depth per strike for the material removal component.

Figure 3:
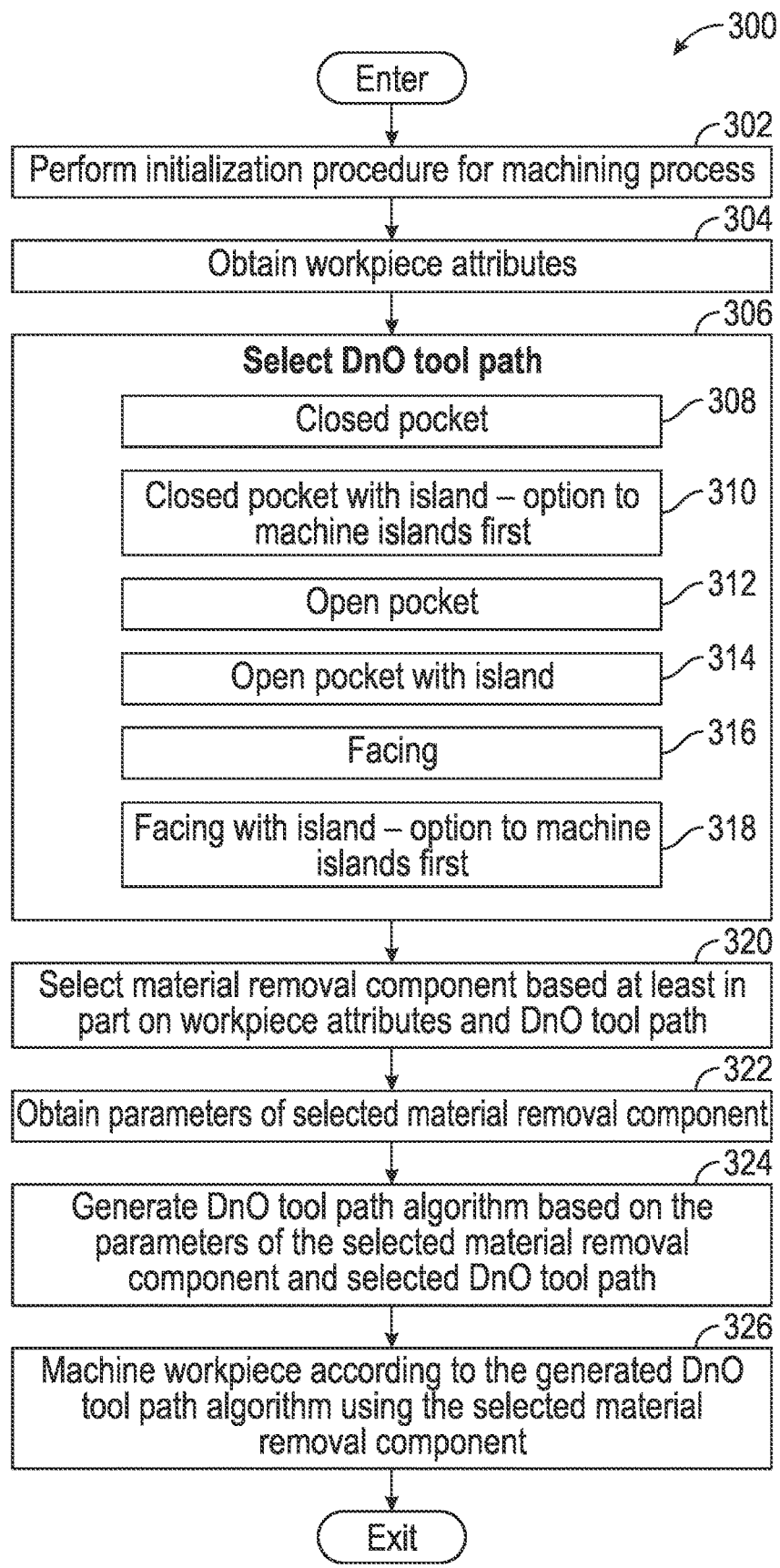
FIG. 3 is a flowchart of another method for generating a tool path plan for machining workpieces, according to certain aspects of the present disclosure.

FIG. 3 is a flowchart of a method 300 for generating a tool path for machining a workpiece (or part) 130 using a material removal component 120, according to certain aspects of the present disclosure. Method 300 may be performed by a tool path planning component (e.g., tool path planning component 122).

Method 300 enters with block 302, where an initialization procedure is performed for a machining process. For example, an operator may use the computing system 110 to input three-dimensional (3D) model object(s) data sets from the host CAD/CAM system (e.g., part, stock, workholding, etc.). The tool path planning component may store a representation of the CAD objects metadata in storage 116. In addition, the tool path planning component may create a minimum bounding box representation in 3D space, and define main direction(s) (e.g., x, y, z, or a combination thereof) relative to setup of the machining process. The tool path planning component may also define the work coordinate system (e.g., origin point and primary x, y, and z directions).

At block 304, the tool path planning component obtains one or more attributes of the workpiece 130. In one example, a CAD meta feature analysis may be performed to represent the workpiece attributes. The workpiece attributes (e.g., geometry attributes) may be stored in storage 116.

At block 306, the tool path planning component selects a DnO tool path (e.g., DnO tool path 124) for the machining process. In certain aspects, the DnO tool path 124 may include a "closed pocket" 308, a "closed pocket with island (with an option to machine islands first)" 310, an "open pocket" 312, an "open pocket with island" 314, "facing" 316, and "facing with island (with an option to machine islands first)" 318.

At block 320, the tool path planning component selects a material removal component (e.g., material removal component 120), based at least in part on the workpiece attributes and DnO tool path. For example, the tool path planning component may select a particular type of CNC cutting tool to use for the machining process, based on the workpiece attributes and DnO tool path. At block 322, the tool path planning component obtains parameters of the selected material removal component (e.g., speeds, feeds, depth of cuts, etc.). The tool path planning component may store the parameters of the selected material removal component in storage 116.

At block 324, the tool path planning component generates a DnO tool path algorithm, based on the parameters of the selected material removal component and selected DnO tool path. Example DnO tool path algorithms are described in further detail herein.

At block 326, the tool path planning component configures the selected material removal component to machine the workpiece according to the generated DnO tool path algorithm. In a reference, non-limiting example, the tool path planning component may create syntax for the cutter location file source (CLFS) for the host CAD/CAM system, create CNC machine G and M code file for the material removal component, load the stock files on the material removal component, and load the code file in the controller of the material removal component.

Figure 4A:
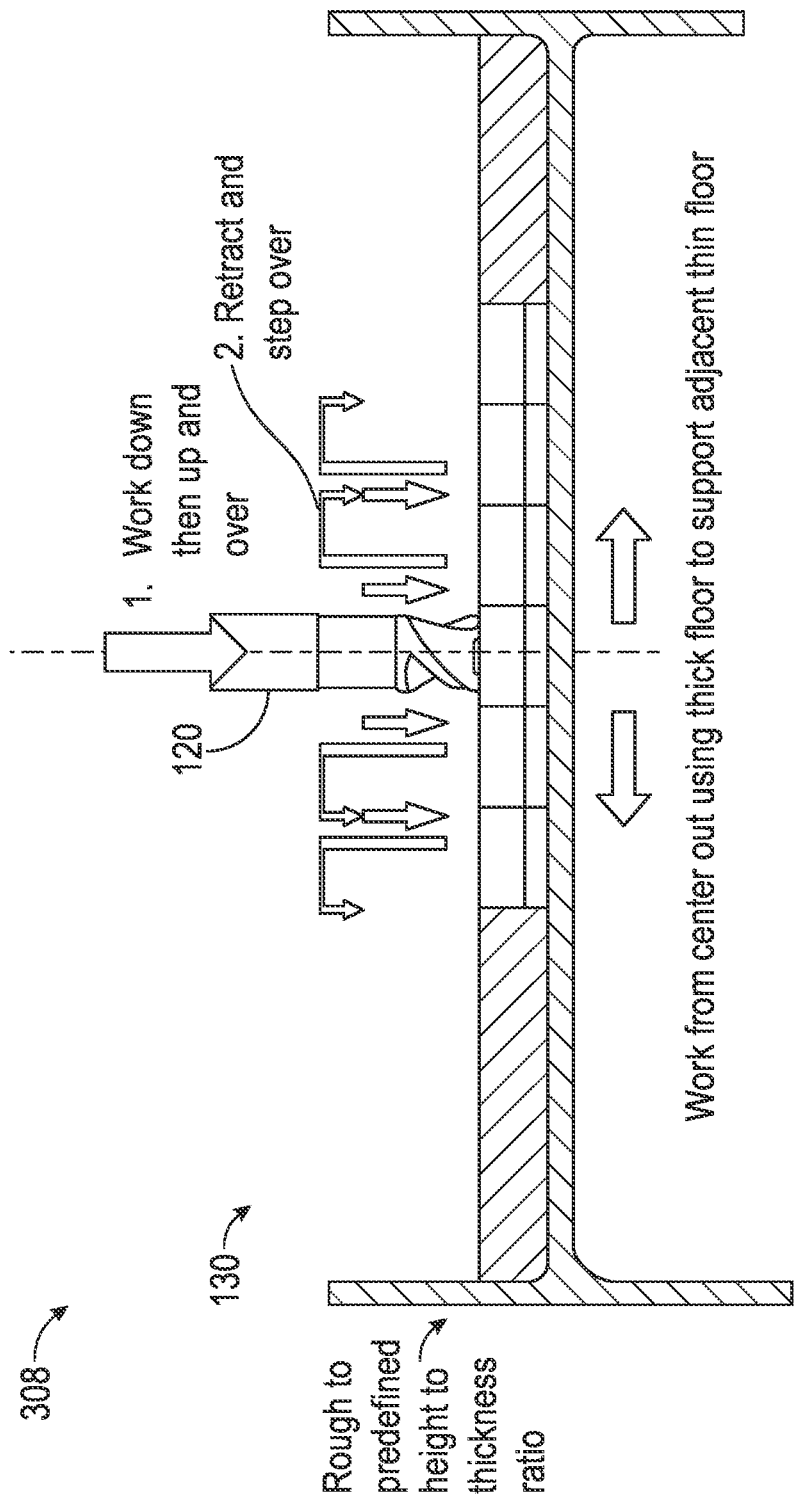
FIGS. 4A-4B depict different views of an example DnO tool path, according to certain aspects of the present disclosure.
Figure 4B:
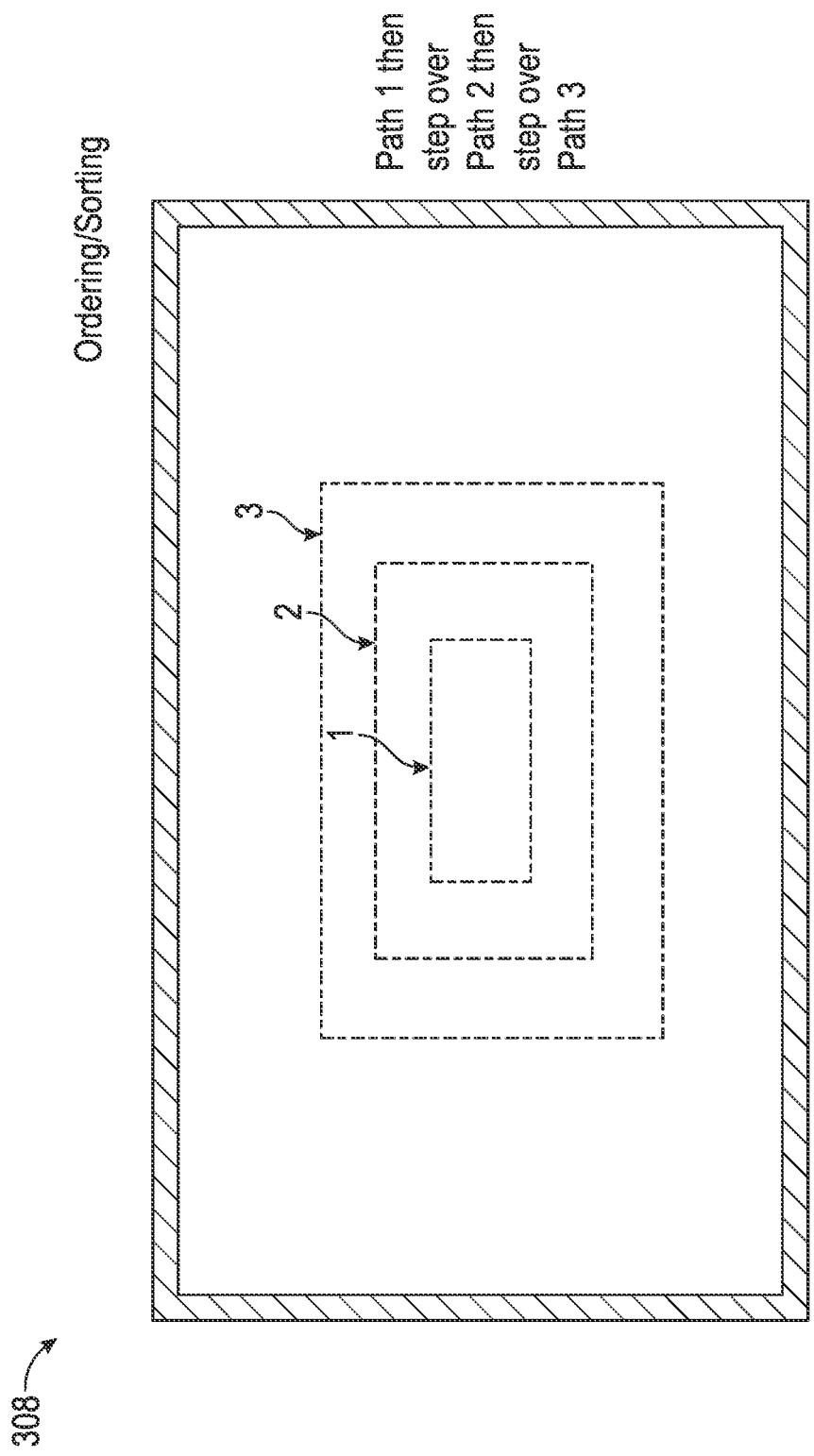

FIGS. 4A-4B depict different views of a DnO tool path used to machine a workpiece, according to certain aspects of the present disclosure. In particular, FIG. 4A depicts a side view and FIG. 4B depicts a top view of the DnO tool path. In certain aspects, the DnO tool path depicted in FIGS. 4A and 4B is a "closed pocket" 308. Note that while the DnO tool path depicted in FIGS. 4A and 4B has a rectangular shape, in other aspects, the DnO tool path may have a different shape.

As shown in FIG. 4A, with the "closed pocket" 308 DnO tool path, the material removal component works from the center out, using the thick floor of the workpiece to support the adjacent thin floor. For example, as shown in FIG. 4B, the material removal component follows path 1, then steps over and follows path 2, and then steps over and follows path 3. In particular, the material removal component, machining by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . , last ADOC=.03 inches).

Figure 5A:
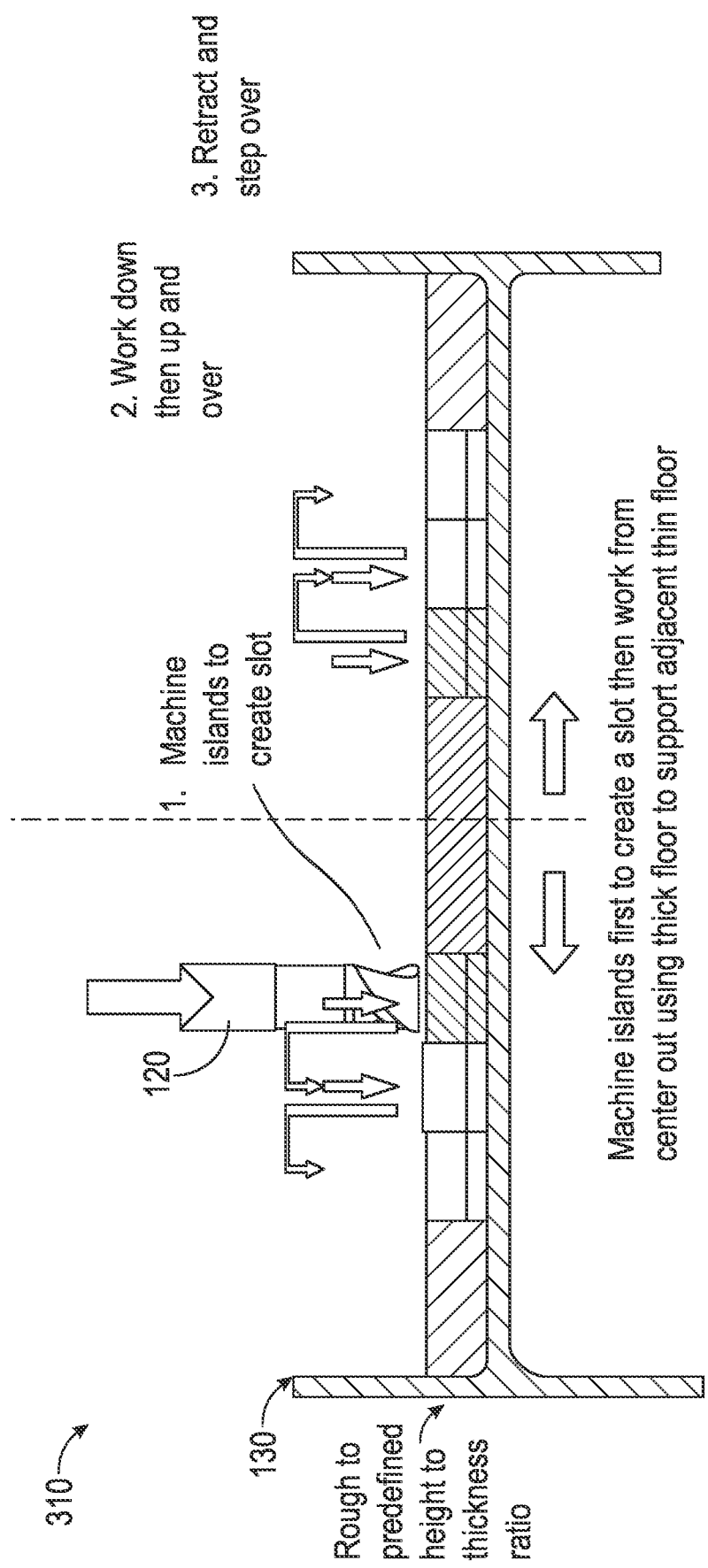
FIGS. 5A-5C depict different views of another example DnO tool path, according to certain aspects of the present disclosure.
Figure 5B:
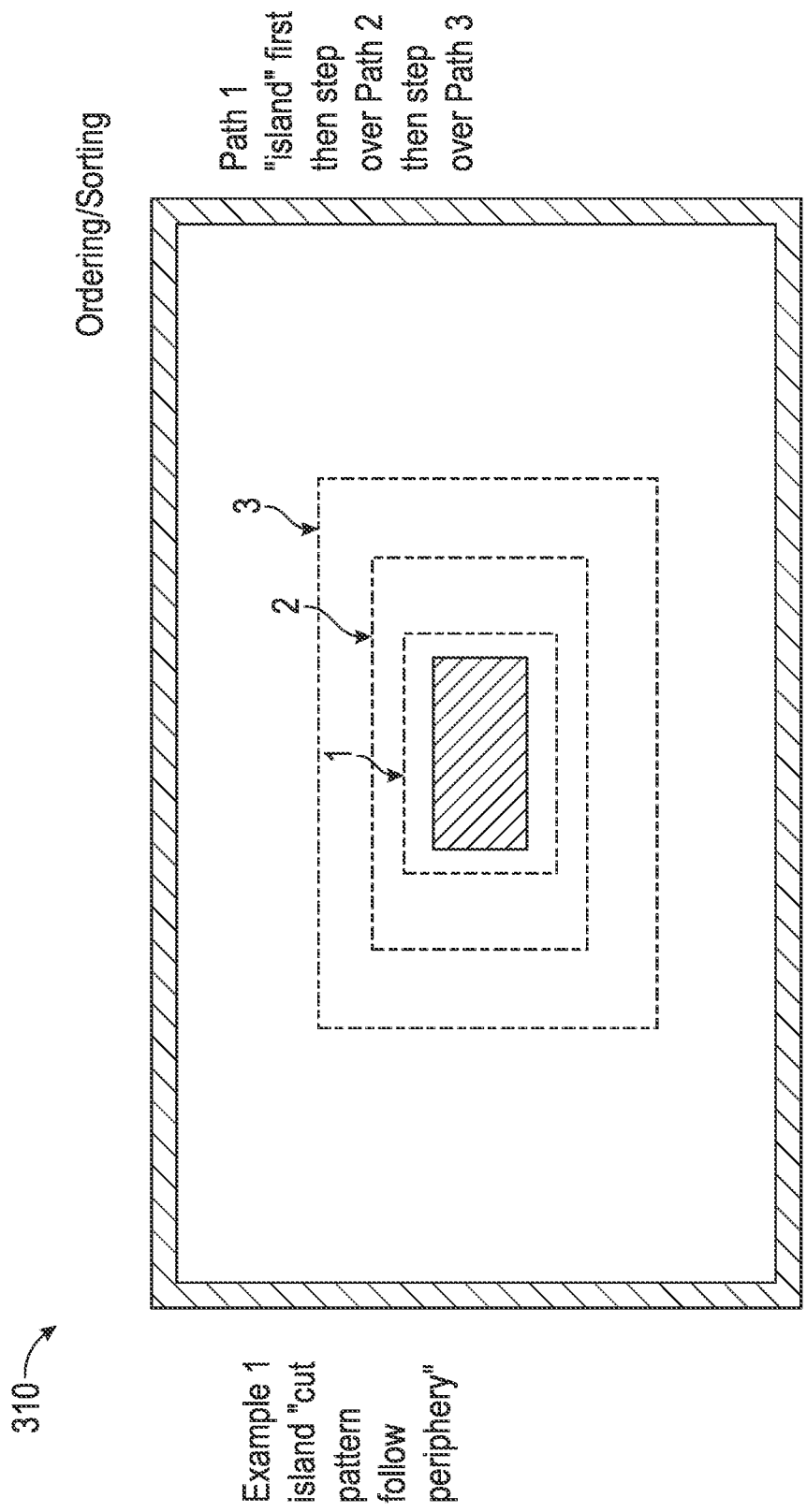
Figure 5C:
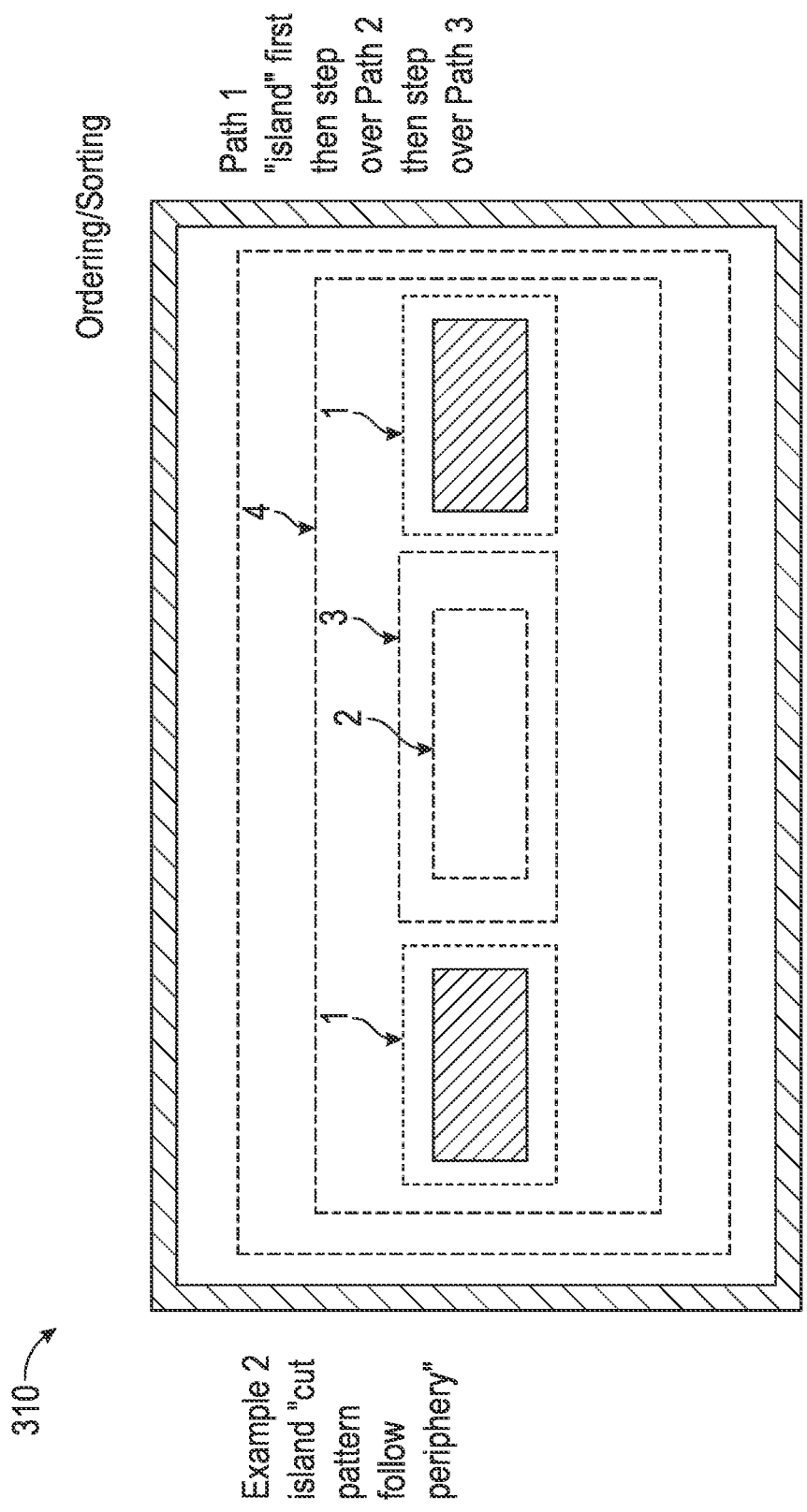

FIGS. 5A-5C depict different views of a DnO tool path used to machine a workpiece, according to certain aspects of the present disclosure. In particular, FIG. 5A depicts a side view of the DnO tool path, FIG. 5B depicts a top view of the DnO tool path with a first option, and FIG. 5C depicts a top view of the DnO tool path with a second option. In certain aspects, the DnO tool path depicted in FIGS. 5A, 5B, and 5C is a "closed pocket with island (with an option to machine islands first)" 310. Note that while the DnO tool path depicted in FIGS. 5A and 5B has a rectangular shape, in other aspects, the DnO tool path may have a different shape.

As shown in FIG. 5A, with the "closed pocket with island" 310 DnO tool path, the material removal component initially machines an island to create a slot, then works from the center out, using the thick floor of the workpiece to support the adjacent thin floor. In a first option shown in FIG. 5B, the material removal component follows path 1 to machine an island, then steps over and follows path 2, and then steps over and follows path 3. In a second option shown in FIG. 5C, the material removal component follows path 1 to machine an island, then steps over and follows path 2, and then steps over and follows path 3. In both the first option depicted in FIG. 5B and the second option depicted in FIG. 5C, the material removal component machines by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . , last ADOC=.03 inches).

FIGS. 6A-6C depict different views of a DnO tool path used to machine a workpiece, according to certain aspects of the present disclosure. In particular, FIG. 6A depicts a side view of the DnO tool path, FIG. 6B depicts a top view of the DnO tool path with a first option, and FIG. 6C depicts a top view of the DnO tool path with a second option. In certain aspects, the DnO tool path depicted in FIGS. 6A, 6B, and 6C is an "open pocket" 312.

As shown in FIG. 6A, with the "open pocket" 312 DnO tool path, the material removal component machines the workpiece from an open boundary of the workpiece to a hard boundary of the workpiece, using the thick floor of the workpiece to support the adjacent thin floor. FIG. 6B depicts one example first option of a cut pattern for the "open pocket" 312 DnO tool path and FIG. 6C depicts another example second option of a cut pattern for the "open pocket" 312 DnO tool path. In the first option and the second option, the material removal component flows path 1, then steps over and follows path 2, and then steps over and follows path 3. The material removal component machines by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . , last ADOC=.03 inches).

Figure 7B:
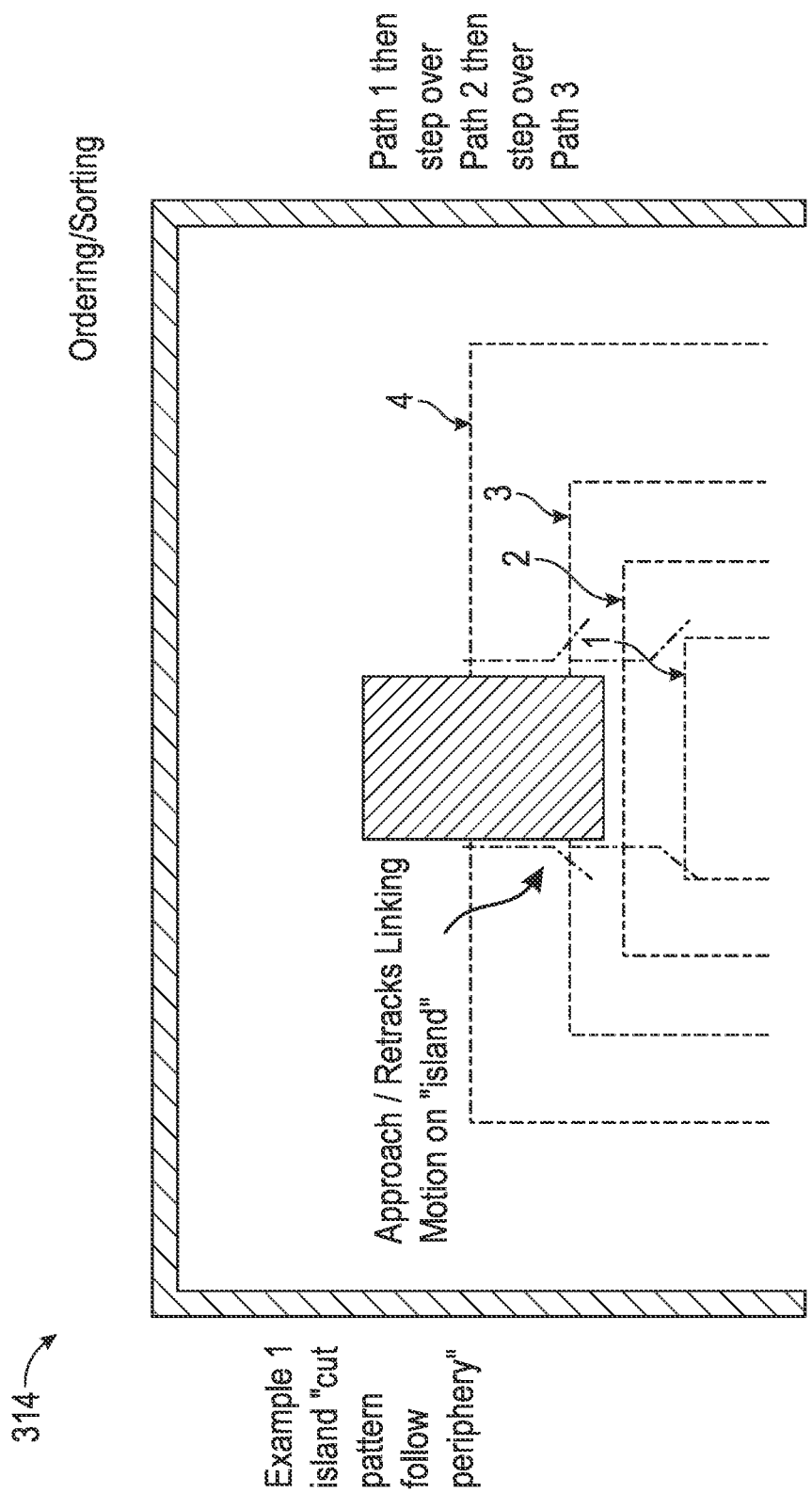
Figure 7C:
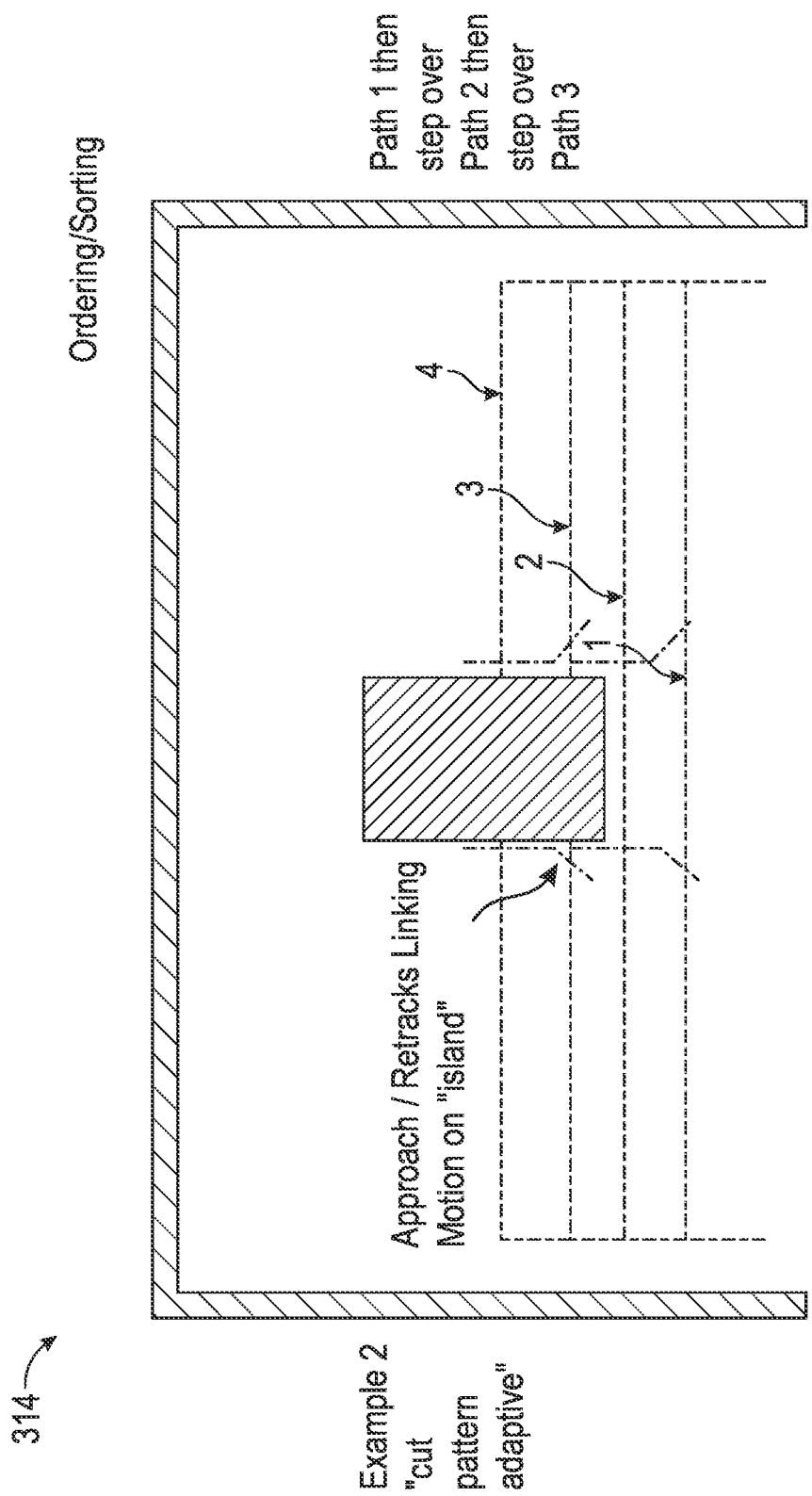

FIGS. 7A-7C depict different views of a DnO tool path used to machine a workpiece, according to certain aspects of the present disclosure. In particular, FIG. 7A depicts a side view of the DnO tool path, FIG. 7B depicts a top view of the DnO tool path with a first option, and FIG. 7C depicts a top view of the DnO tool path with a second option. In certain aspects, the DnO tool path depicted in FIGS. 7A, 7B, and 7C is an "open pocket with island" 314.

As shown in FIG. 7A, with the "open pocket with island" 314 DnO tool path, the material removal component machines the workpiece by working from an open boundary of the workpiece to a hard boundary of the workpiece, taking into consideration the island and using the thick floor of the workpiece to support the adjacent thin floor. FIG. 7B depicts one example first option of a cut pattern for the "open pocket with island" 314 DnO tool path and FIG. 7C depicts another example second option of a cut pattern for the "open pocket with island" 314 DnO tool path. In the first option and the second option, the material removal component flows path 1, then steps over and follows path 2, and then steps over and follows path 3. The material removal component machines by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . , last ADOC=.03 inches).

Figure 8B:
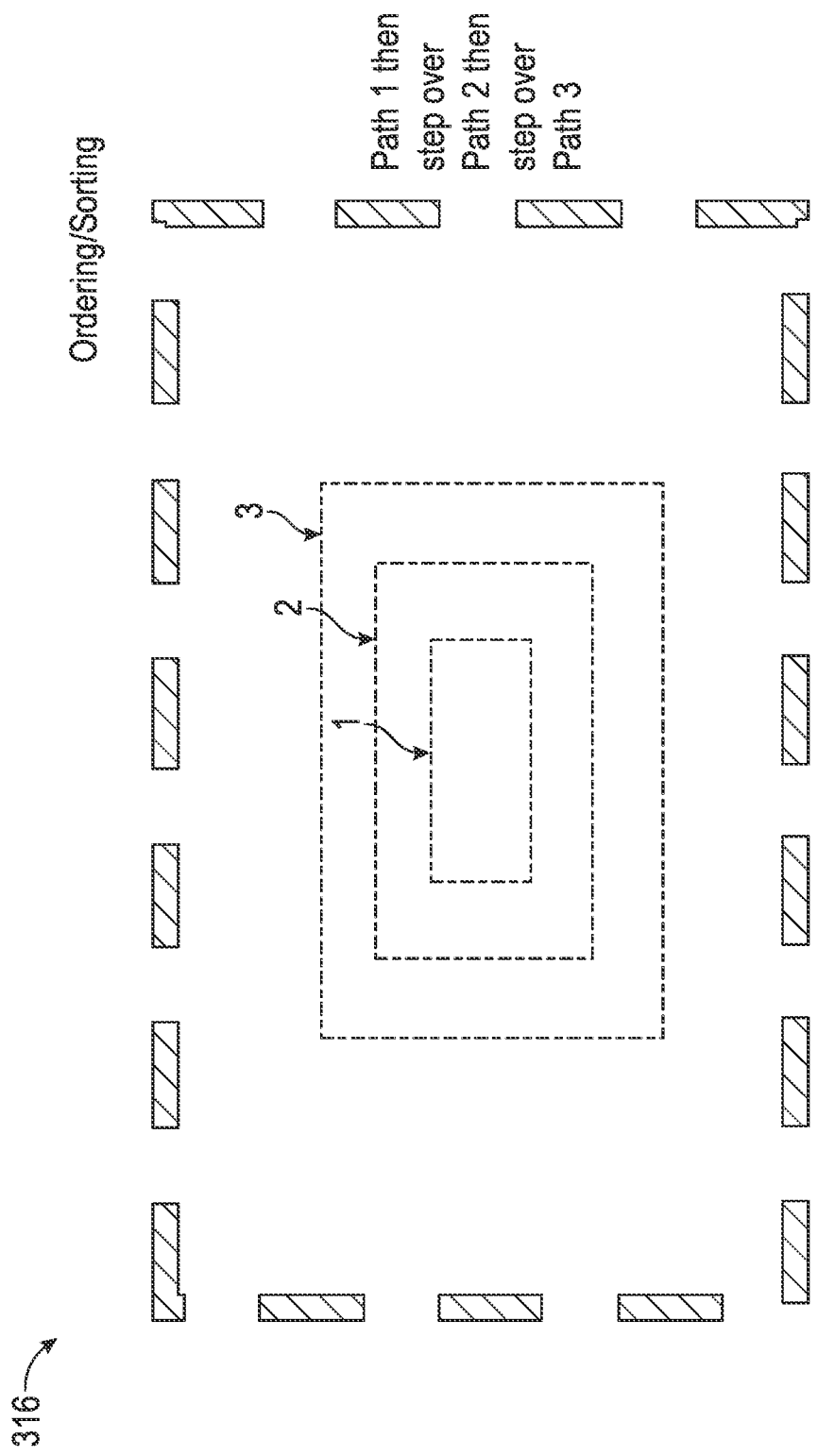

FIGS. 8A-8B depict different views of a DnO tool path used to machine a workpiece, according to certain aspects of the present disclosure. In particular, FIG. 8A depicts a side view of the DnO tool path and FIG. 8B depicts a top view of the DnO tool path. In certain aspects, the DnO tool path depicted in FIGS. 8A and 8B is a "facing" tool path 316. Note that while the DnO tool path depicted in FIGS. 8A and 8B has a rectangular shape, in other aspects, the DnO tool path may have a different shape.

As shown in FIG. 8A, with the "facing" 314 DnO tool path, the material removal component machines the workpiece by working from the center out, using the thick floor of the workpiece to support the adjacent thin floor. As shown in FIG. 8B, the material removal component machines by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . last ADOC=.03 inches).

Figure 9A:
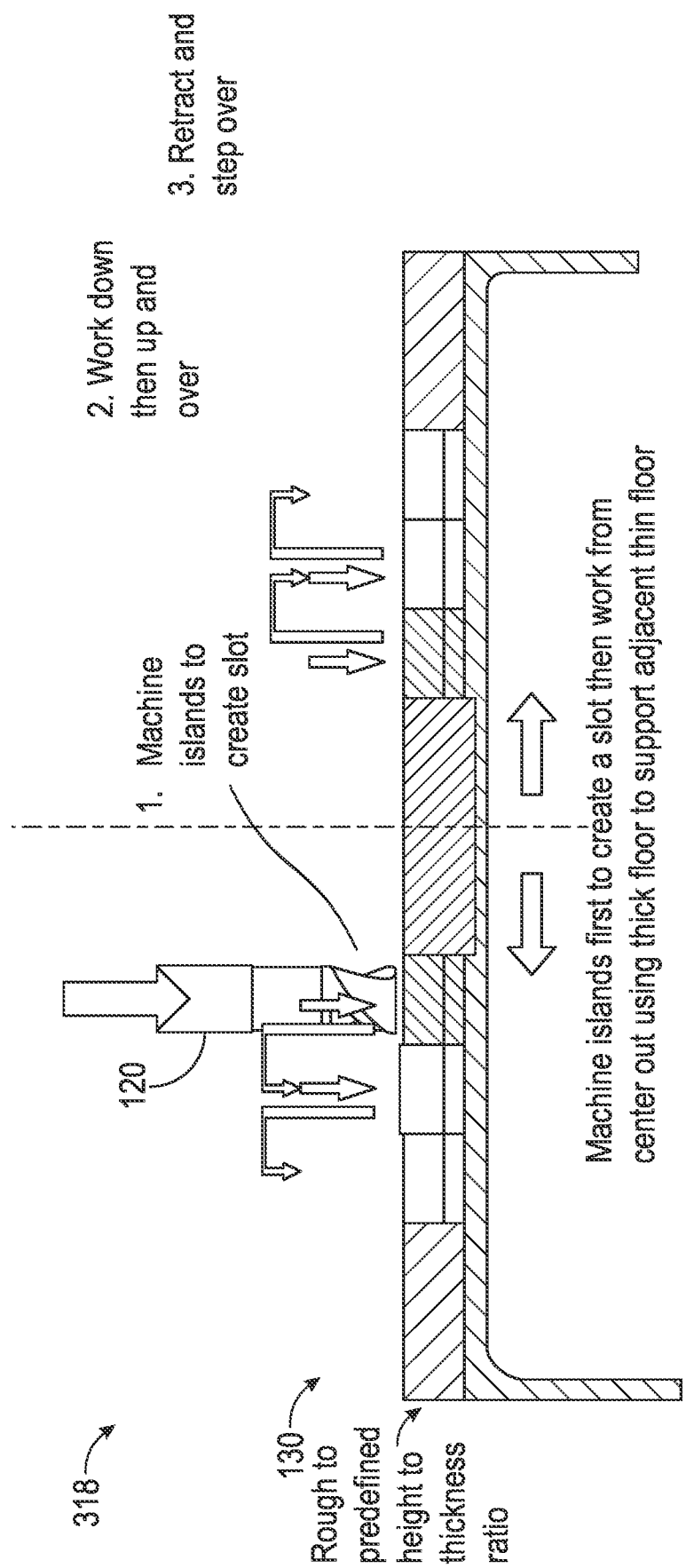
FIGS. 9A-9C depict different views of another example DnO tool path, according to certain aspects of the present disclosure.
Figure 9B:
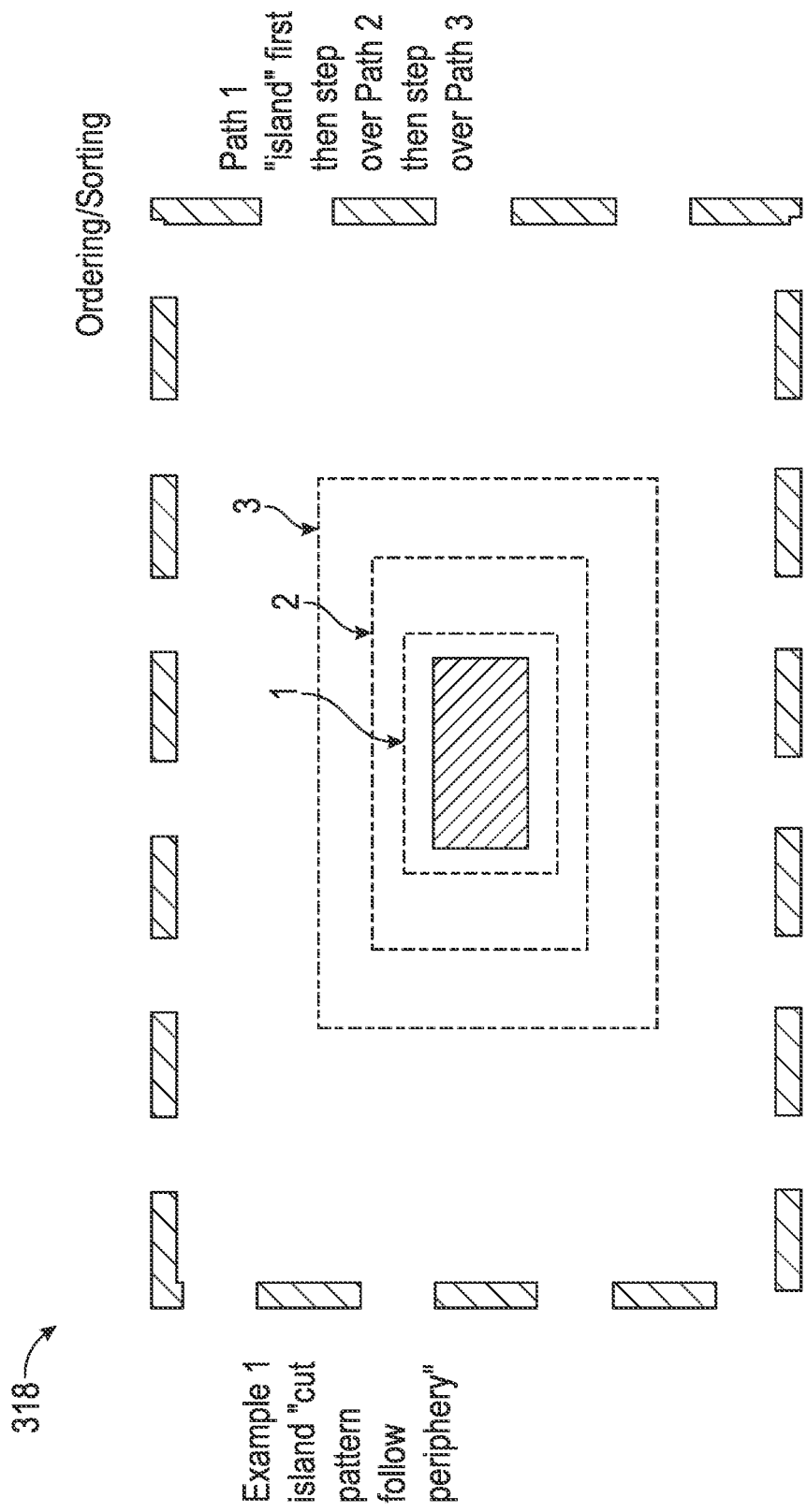
Figure 9C:
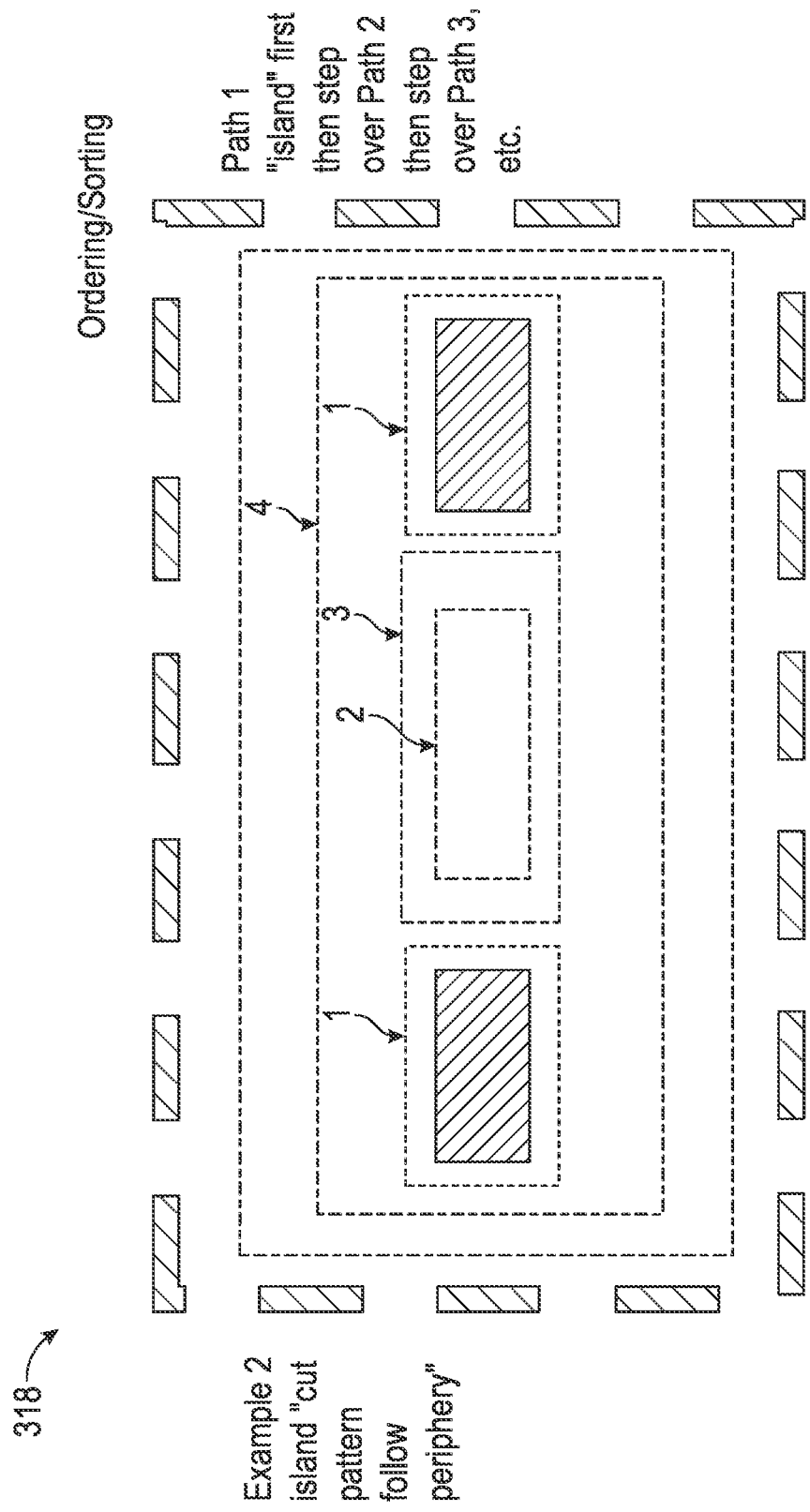

FIGS. 9A-9C depict different views of a DnO tool path used to machine a workpiece, according to certain aspects of the present disclosure. In particular, FIG. 9A depicts a side view of the DnO tool path, FIG. 9B depicts a top view of the DnO tool path with a first option, and FIG. 9C depicts a top view of the DnO tool path with a second option. In certain aspects, the DnO tool path depicted in FIGS. 9A, 9B, and 9C is a "facing with island with an option to machine island first" 318. Note that while the DnO tool path depicted in FIGS. 9A-9C has a rectangular shape, in other aspects, the DnO tool path may have a different shape.

As shown in FIG. 9A, with the "facing with island" 318 DnO tool path, the material removal component machines the workpiece by machining the island first to create a slot, then works from the center out using the thick floor of the workpiece to support the adjacent thin floor. FIG. 9B depicts one example first option of a cut pattern for the "facing with island" 318 DnO tool path and FIG. 9C depicts another example second option of a cut pattern for the "facing with island" 318 DnO tool path. The material removal component machines by depth first, works down, retracts, and steps over, maintaining a predefined height to thickness ratio (e.g., 4:1 height to thickness ratio) and variable depth per strike (e.g., $1^{st}$ axial depth to cut (ADOC)=.1 inches, . . . , last ADOC=.03 inches).

A further understanding of at least some of the aspects of the present disclosure is provided with reference to the following numbered Clauses, in which:

Clause 1: A computer-implemented method for machining a workpiece, the computer-implemented method comprising: obtaining an indication of one or more parameters associated with the workpiece; determining a down and out (DnO) tool path plan for machining the workpiece; selecting a material removal component for machining the workpiece, based at least in part on the one or more parameters and the DnO tool path plan; and removing, with the selected material removal component, extraneous material from the workpiece according to the DnO tool path plan.

Clause 2: The computer-implemented method of Clause 1, wherein the material removal component is selected from a plurality of material removal components available for machining the workpiece.

Clause 3: The computer-implemented method of any of Clauses 1 to 2, wherein determining the DnO tool path plan comprises receiving an indication of the DnO tool path plan, out of a plurality of DnO tool path plans, from an operator.

Clause 4: The computer-implemented method of any of Clauses 1 to 3, wherein the DnO tool path plan comprises a pattern along the workpiece for the material removal component to follow when removing the extraneous material from the workpiece.

Clause 5: The computer-implemented method of Clause 4, wherein the pattern has a rectangular shape, a radial shape, a spiral shape, or a zig-zag shape.

Clause 6: The computer-implemented method of any of Clauses 4 to 5, wherein the DnO tool path plan maintains a predefined height to thickness ratio for the workpiece.

Clause 7: The computer-implemented method of any of Clauses 4 to 6, wherein the DnO tool path plan specifies a variable depth per strike for the material removal component.

Clause 8: A material removal system comprising: a material removal component configured to remove material from a workpiece; a memory comprising executable instructions; and a processor in data communication with the memory and configured to execute the executable instructions to perform an operation comprising: obtaining an indication of one or more parameters associated with the workpiece; determining a down and out (DnO) tool path plan for machining the workpiece; selecting the material removal component for machining the workpiece, based at least in part on the one or more parameters and the DnO tool path plan; and removing, with the selected material removal component, extraneous material from the workpiece according to the DnO tool path plan.

Clause 9: The material removal system of Clause 8, wherein the material removal component is selected from a plurality of material removal components available for machining the workpiece.

Clause 10: The material removal system of any of Clauses 8 to 9, wherein determining the DnO tool path plan comprises receiving an indication of the DnO tool path plan, out of a plurality of DnO tool path plans, from an operator.

Clause 11: The material removal system of any of Clauses 8 to 10, wherein the DnO tool path plan comprises a pattern along the workpiece for the material removal component to follow when removing the extraneous material from the workpiece.

Clause 12: The material removal system of Clause 11, wherein the pattern has a rectangular shape, a radial shape, a spiral shape, or a zig-zag shape.

Clause 13: The material removal system of any of Clauses 11 to 12, wherein the DnO tool path plan maintains a predefined height to thickness ratio for the workpiece.

Clause 14: The material removal system of any of Clauses 11 to 13, wherein the DnO tool path plan specifies a variable depth per strike for the material removal component.

Clause 15: A computer-readable storage medium having computer-readable program code embodied therewith for performing an operation comprising: obtaining an indication of one or more parameters associated with a workpiece; determining a down and out (DnO) tool path plan for machining the workpiece; selecting a material removal component for machining the workpiece, based at least in part on the one or more parameters and the DnO tool path plan; and removing, with the selected material removal component, extraneous material from the workpiece according to the DnO tool path plan.

Clause 16: The computer-readable storage medium of Clause 15, wherein determining the DnO tool path plan comprises receiving an indication of the DnO tool path plan, out of a plurality of DnO tool path plans, from an operator.

Clause 17: The computer-readable storage medium of any of Clauses 15 to 16, wherein the DnO tool path plan comprises a pattern along the workpiece for the material removal component to follow when removing the extraneous material from the workpiece.

Clause 18: The computer-readable storage medium of Clause 17, wherein the pattern has a rectangular shape, a radial shape, a spiral shape, or a zig-zag shape.

Clause 19: The computer-readable storage medium of any of Clauses 17 to 18, wherein the DnO tool path plan maintains a predefined height to thickness ratio for the workpiece.

Clause 20: The computer-readable storage medium of any of Clauses 17 to 19, wherein the DnO tool path plan specifies a variable depth per strike for the material removal component.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for machining a workpiece, the computer-implemented method comprising:
   obtaining an indication of one or more parameters associated with the workpiece;
   determining a down and out (DnO) tool path plan for machining the workpiece;
   selecting a material removal component for machining the workpiece, based at least in part on the one or more parameters and the DnO tool path plan; and
   removing, with the selected material removal component, extraneous material from the workpiece according to the DnO tool path plan.

2. The computer-implemented method of claim 1, wherein the material removal component is selected from a plurality of material removal components available for machining the workpiece.

3. The computer-implemented method of claim 1, wherein determining the DnO tool path plan comprises receiving an indication of the DnO tool path plan, out of a plurality of DnO tool path plans, from an operator.

4. The computer-implemented method of claim 1, wherein the DnO tool path plan comprises a pattern along the workpiece for the material removal component to follow when removing the extraneous material from the workpiece.

5. The computer-implemented method of claim 4, wherein the pattern has a rectangular shape, a radial shape, a spiral shape, or a zig-zag shape.

6. The computer-implemented method of claim 4, wherein the DnO tool path plan maintains a predefined height to thickness ratio for the workpiece.

7. The computer-implemented method of claim 4, wherein the DnO tool path plan specifies a variable depth per strike for the material removal component.

8. A material removal system comprising:
   a material removal component configured to remove material from a workpiece;
   a memory comprising executable instructions; and
   a processor in data communication with the memory and configured to execute the executable instructions to perform an operation comprising:
      obtaining an indication of one or more parameters associated with the workpiece;
      determining a down and out (DnO) tool path plan for machining the workpiece;
      selecting the material removal component for machining the workpiece, based at least in part on the one or more parameters and the DnO tool path plan; and
      removing, with the selected material removal component, extraneous material from the workpiece according to the DnO tool path plan.

9. The material removal system of claim 8, wherein the material removal component is selected from a plurality of material removal components available for machining the workpiece.

10. The material removal system of claim 8, wherein determining the DnO tool path plan comprises receiving an indication of the DnO tool path plan, out of a plurality of DnO tool path plans, from an operator.

11. The material removal system of claim 8, wherein the DnO tool path plan comprises a pattern along the workpiece for the material removal component to follow when removing the extraneous material from the workpiece.

12. The material removal system of claim 11, wherein the pattern has a rectangular shape, a radial shape, a spiral shape, or a zig-zag shape.

13. The material removal system of claim 11, wherein the DnO tool path plan maintains a predefined height to thickness ratio for the workpiece.

14. The material removal system of claim 11, wherein the DnO tool path plan specifies a variable depth per strike for the material removal component.

15. A non-transitory computer-readable storage medium having computer-readable program code embodied therewith for performing an operation comprising:

obtaining an indication of one or more parameters associated with a workpiece;

determining a down and out (DnO) tool path plan for machining the workpiece;

selecting a material removal component for machining the workpiece, based at least in part on the one or more parameters and the DnO tool path plan; and removing, with the selected material removal component, extraneous material from the workpiece according to the DnO tool path plan.

16. The computer-readable storage medium of claim 15, wherein determining the DnO tool path plan comprises receiving an indication of the DnO tool path plan, out of a plurality of DnO tool path plans, from an operator.

17. The computer-readable storage medium of claim 15, wherein the DnO tool path plan comprises a pattern along the workpiece for the material removal component to follow when removing the extraneous material from the workpiece.

18. The computer-readable storage medium of claim 17, wherein the pattern has a rectangular shape, a radial shape, a spiral shape, or a zig-zag shape.

19. The computer-readable storage medium of claim 17, wherein the DnO tool path plan maintains a predefined height to thickness ratio for the workpiece.

20. The computer-readable storage medium of claim 17, wherein the DnO tool path plan specifies a variable depth per strike for the material removal component.

* * * * *